United States Patent [19]

Mitsuhashi

[11] Patent Number: 4,878,608

[45] Date of Patent: Nov. 7, 1989

[54] HAND STAPLER FOR USE WITH A BAR OF ORNAMENTED STAPLES

[75] Inventor: Yoshio Mitsuhashi, Yokohama, Japan

[73] Assignee: M.G.S. Japan Co., Ltd., Tokyo, Japan

[21] Appl. No.: 280,563

[22] Filed: Dec. 6, 1988

[30] Foreign Application Priority Data

Jul. 13, 1988 [JP] Japan .................... 63-172775

[51] Int. Cl.⁴ ..................... B25C 5/02; B25C 5/06
[52] U.S. Cl. ..................... 227/120; 227/148
[58] Field of Search ................. 227/156, 120, 148

[56] References Cited

U.S. PATENT DOCUMENTS 4,182,474  1/1980  Sato .................. 227/120 X
4,225,075  9/1980  Chi .................. 227/120 X Primary Examiner—Paul A. Bell
Attorney, Agent, or Firm—Ladas & Parry

[57] ABSTRACT

A stapler for use with sheet metal staples each having an ornament joined to a bridge interconnecting a pair of parallel legs. The staples are bonded together to form a staple bar, with the ornaments placed in overlapping relation to one another so that the bridges of the joined staples form an obtuse angle with each pair of staple legs. The stapler has an elongate staple magazine which is shaped to accommodate the ornamented staple bar and which is pivoted at its rear end on a base so that the front end of the staple magazine is movable into and out of engagement with an anvil or matrix on the base. Pivotally coupled to both the base and the staple magazine, a handle has an ejector for driving the successive ornamented staples out of the front end of the staple magazine against the anvil on the base.

10 Claims, 3 Drawing Sheets

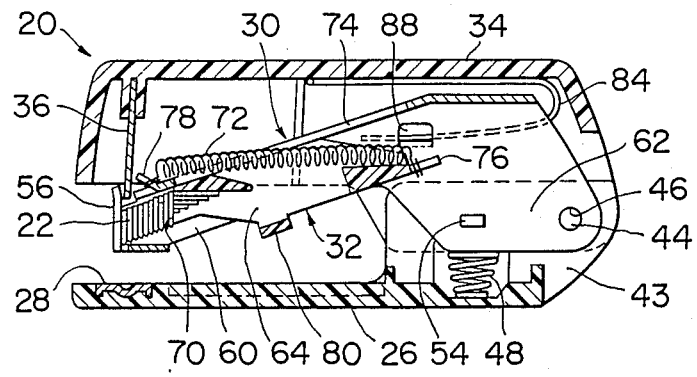
FIG. 1
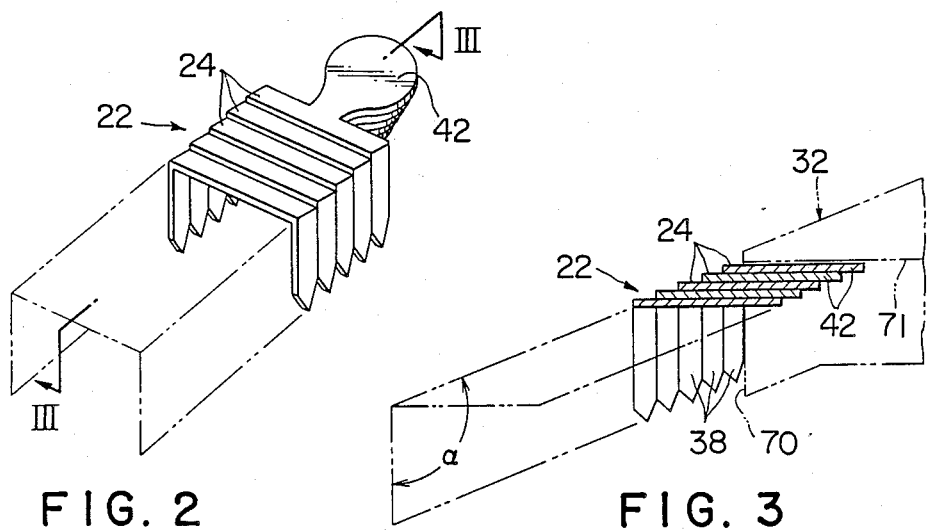
FIG. 2
FIG. 3
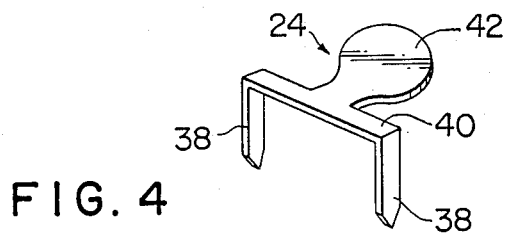
FIG. 4

HAND STAPLER FOR USE WITH A BAR OF ORNAMENTED STAPLES

BACKGROUND OF THE INVENTION

This invention relates to staplers, and more specifically to hand operated staplers for binding sheets of paper or like material together. Still more specifically, the invention deals with an improved hand stapler for use with ornamented staples such that a bridge interconnecting a pair of staple legs is provided with a flat ornamental portion such as in the shape of a circle or like geometric figure, a conventionalized flower or animal, etc. The stapler of the invention is notable for its capability of accepting a plurality or multiplicity of such ornamented staples separably joined together into a staple bar.

Japanese Utility Model Publication No. 57-43656 discloses ornamented sheet metal staples of the type under consideration. Such staples are not only aesthetically favorable but serve a utilitarian purpose, too, as suitable markings are printed or otherwise inscribed on the ornamental portion. The cited Japanese utility model also describes and claims a stapler for use with such ornamented staples. An objection to this prior art device is that it can be loaded with only one staple at a time, the loaded staple being magnetically retained in position thereon before being driven through desired sheets of paper or like penetrable material. Thus the known stapler has been very inconvenient of use for a succession of stapling operations as each such operation must be preceded by the loading of a staple in the device.

SUMMARY OF THE INVENTION

The present invention realizes a rapid succession of stapling operations with ornamented staples by providing an improved stapler in which a plurality or multiplicity of such staples can be loaded simultaneously.

Briefly, the improved stapler of the invention is intended for use with a staple bar having a plurality or multiplicity of ornamented staples separably joined together, each ornamented staple having a bridge interconnecting a pair of parallel legs, and an ornament joined to the bridge. In order to be joined into the staple bar, the staples have their ornaments in overlapping relation to one another, with the result that the bridges of the joined staples form an obtuse angle with respect to each pair of staple legs.

For use with the ornamented staple bar of the above configuration, the improved stapler comprises a base having an anvil, a staple magazine to be loaded with the staple bar, and a handle having an ejector for driving the successive ornamented staples from within the staple magazine against the anvil on the base. The base, the staple magazine and the handle are all coupled together for independent pivotal displacement one with respect to another.

The invention particularly features the novel configuration of the staple magazine, which is pivoted at its rear end and which has a free front end from which the loaded staples are successively ejected onto the anvil on the base. The staple magazine comprises a front end wall against which the loaded staple bar is to be urged endwise by staple pusher means, and an elongate guide wall extending rearwardly from the front end wall for relative sliding contact with the bridges of the loaded staple bar. The improved configuration of the staple magazine is such that there is approximately the same obtuse angle between the front end wall and guide wall of the staple magazine as between the bridges of the staple bar and each pair of staple legs.

So constructed, the improved stapler of the invention permits the bar of ornamented staples to be loaded in the staple magazine, and to be successively ejected therefrom, in the same way as the conventional U-shaped staples are loaded in an ejected from the associated staple magazine.

The above and other features and advantages of the invention will become more apparent, and the invention itself will best be understood, from a study of the following description and appended claims, with reference had to the attached drawings showing some preferable embodiments of the invention.

BRIEF DESCRIPTION OF THE DRAWINGS

FIG. 1 is a longitudinal section through the hand stapler embodying the principles of the invention;

FIG. 2 is an enlarged perspective view of a bar or ornamented sheet metal staples for use with the stapler of FIG. 1;

FIG. 3 is a longitudinal section through the staple bar of FIG. 2, taken along the line III—III therein;

FIG. 4 is a perspective view of one of the ornamented sheet metal staples of FIGS. 2 and 3;

DESCRIPTION OF THE PREFERRED EMBODIMENTS

General

Figure 5:
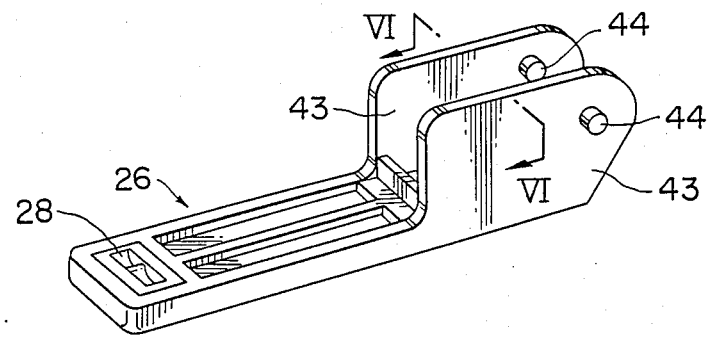
FIG. 5 is an enlarged perspective view of the base of the stapler of FIG. 1.

The representative hand stapler 20 illustrated in FIG. 1 is intended for use with a bar 22 of ornamented sheet metal staples 24 illustrated in detail in FIGS. 2-4. The stapler 20 comprises an elongate base 26 having an anvil or matrix 28 adjacent its front end shown directed to the left. Pivotally supported at the rear end of the base 26 is a staple magazine 30 in the form of an elongate box for housing the ornamented staple bar 22. A staple pusher 32 is slidably mounted within the staple magazine 30 for pushing the loaded staple bar 22 toward the front end of the staple magazine, from which the staples are to be successively ejected against the anvil 28 on the base 26.

Employed for such ejection of the ornamented staples 24 is an elongate handle 34 overlying the staple magazine 30. A staple ejector 36 depends from the front end of the handle 34 for relative movement into and out of the front end of the staple magazine 30. The handle 34 is pivotally coupled at its rear end to both the base 26 and the staple magazine 30. The base 26, the staple magazine 30, and the handle 34 are all independently pivotable one with respect to another about a common axis.

The following is a more detailed discussion of the ornamented sheet metal staple bar 22, the stapler base 26, the staple magazine 30, the staple pusher 32, and the handle 34 with the staple ejector 36, followed by the description of operation. Such detailed discussion will be divided under separate headings for the clarity of disclosure.

Ornamented Staple Bar

The hand stapler 20 presupposes the use of the bar 22 of ornamented sheet metal staples 24 illustrated in FIGS. 2 and 3. As will be better understood from FIG. 4, each staple 24 comprises a pair of parallel legs 38, a bridge 40 interconnecting the legs, and an ornament 42 joined to the bridge in coplanar relation thereto. Although the ornament 42 is herein shown disposed only on one side of the bridge 40, such an ornament could be formed so as to extend toward both sides of the bridge, as will be disclosed in conjunction with an alternative embodiment of the invention to be set forth subsequently. It should also be understood that the illustrated circular shape of the ornament 42 represents but one of a myriad of possible shapes the ornament may take in practice. Any desired markings or images may be printed or otherwise reproduced on the ornament 42.

A plurality or multiplicity of such ornamented sheet metal staples 24 are bonded or otherwise separably joined together to form the staple bar 22 of FIGS. 2 and 3. As will be best understood from FIG. 3, the ornaments 42 of the joined staples 22 are disposed in overlapping relation to one another. By reason of this overlapping arrangement of the ornaments 42 the bridges 40 of the joined staples necessarily form an obtuse angle $\alpha$ with respect to each pair of staple legs 38.

Stapler Base

As illustrated in detail in FIG. 5, the stapler base 26 is molded from a plastic in one piece with a pair of confronting bearing walls 43 erected from its rear end. The noted anvil 28, which is metal made, is mounted at or adjacent the front end of the base 26. The bearing walls 43 have a pair of aligned trunnions 44 rigidly mounted thereto to provide a common axis for the independent pivotal motion of the staple magazine 30 and the handle 34 with respect to the base 26. Each trunnion 44 extends toward the opposite sides of the associated bearing wall 43. The inwardly extending portions of the trunnions 44 are rotatably engaged in holes 46, FIG. 7, in the staple magazine 30. The outwardly extending portions of the trunnions 44 are rotatably received in holes, not shown, in the handle 34.

Figures 6, 7:
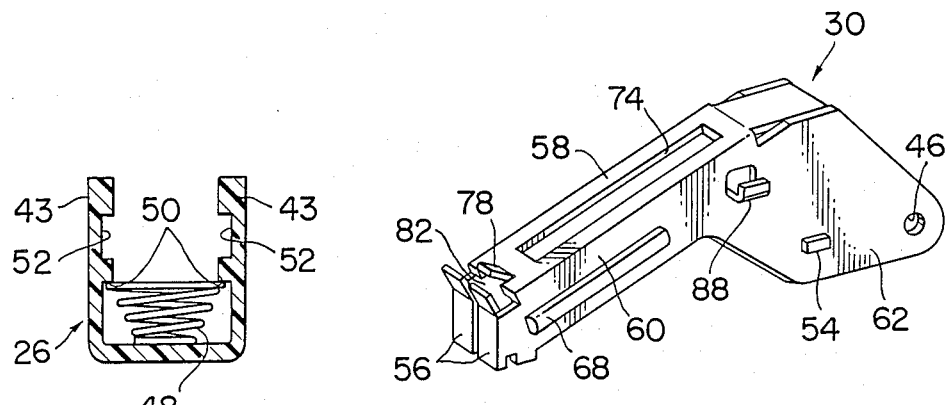
FIG. 6 is a section through the stapler base of FIG. 5, taken along the line VI—VI therein, the stapler base being shown together with the preloaded base spring mounted in position thereon.
FIG. 7 is a perspective view of the staple magazine of the stapler of FIG. 1.

FIG. 6 reveals a spiral compression spring 48 mounted on the base 26 between the pair of bearings walls 43. This spring 48, hereinafter referred to as the base spring, functions as a return spring for the staple magazine 30, biasing the same in a clockwise direction, as viewed in FIG. 1, from its fully depressed position, in which the front end of the staple magazine hits the anvil 28, to the standby or normal position of FIG. 1 in which a preassigned spacing exists between the front end of the staple magazine and the anvil for the insertion of papers or the like to be stapled.

Formed on the opposed inside surfaces of the bearing walls 43 are a pair of overhangs 50 which conjointly serve as retainer for engaging the base spring 48 and holding the same precompressed when the staple magazine 30 is in the normal position of FIG. 1. Therefore, when in this normal position, the staple magazine 30 is free from the force of the base spring 48.

Also formed in the inside surfaces of the bearing walls 43 are a pair of recesses 52 positioned just above the overhangs 50. The staple magazine 30 has a pair of lateral protuberances, one seen at 54 in FIGS. 1 and 7, for engagement in the bearing wall recesses 52 when the staple magazine is in the FIG. 1 normal position. The staple magazine 30 is thus locked against pivotal displacement in a clockwise direction, as viewed in FIG. 1, away from the base 26. However, when the staple magazine 30 together with the handle 34 is manually forced away from the base 26, as for loading the staple bar 22 in the staple magazine, the pair of bearing walls 43 on the base will resiliently flex away from each other thereby releasing the staple magazine protuberances 54.

It will be appreciated that no strong force is required for retaining the staple magazine 30 in the normal position because, being engaged by the pair of bearing wall overhangs 50, the base spring 48 exerts no clockwise bias on the staple magazine when the latter is in the normal position. The staple magazine 30 can thus be readily turned away from the base 26 with the exertion of minimal manual force.

Staple Magazine

FIG. 7 best illustrates the configuration of the staple magazine 30 to be loaded with the staple bar 22 of FIGS. 2 and 3. Wholly made of sheet metal, the staple magazine 30 is substantially in the shape of an elongate, open bottom box, comprising a front end wall 56, a top guide wall 58, and a pair of side guide wall 60. When loaded in the staple magazine 30, the staple bar 22 is to be urged endwise against the front end wall 56, with the staple bridges 40 in sliding contact with the top guide wall 58, and the staple legs 38 in sliding contact with the side guide walls 60. Further the staple magazine 30 is formed in one piece with a pair of lugs 62 depending from the rear end of the side guide walls 60. These depending lugs 62 are bored at 46 to receive the trunnions 44 on the bearing walls 43 of the base 26.

When in the normal position as depicted in FIG. 1, the staple magazine 30 is at an angle to the base 26, slanting upwardly as it extends rearwardly, in order to hold the staple bar 22 with each staple 24 more or less perpendicular to the base 26. The front end wall 56 of the staple magazine 30 must also be substantially perpendicular to the base 26. It will therefore be seen that there is approximately the same obtuse angle $\alpha$ between the front end wall 56 and top guide wall 58 as between the row of bridges 40 and each pair of legs 38 of the staple bar 22.

Staple Pusher

Figure 8:
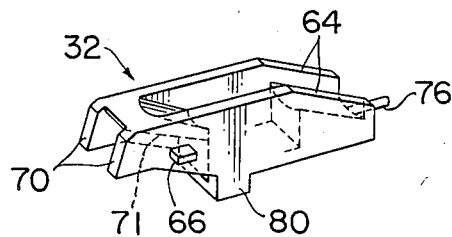
FIG. 8 is an enlarged perspective view of the staple pusher of the stapler of FIG. 1.

As shown in detail in FIG. 8, the staple pusher 32 is a one piece molding of a plastic, including a pair of side walls 64 which are rigidly interconnected in parallel spaced relation to each other. The side walls 64 have a pair of lateral projections 66, one seen, which are slidably engaged in guide channels 68, FIG. 7, formed in the opposite inside surfaces of the side guide walls 60 of the staple magazine 30. Thus, guided by the guide channels 68, the staple pusher 32 is slidable back and forth within the staple magazine 30.

The front ends 70 of the staple pusher side walls 64 are intended for abutting engagement with the pair of legs 38, FIG. 3, of the rearmost staple 24 of the staple bar 22 loaded in the staple magazine 30. A consideration of FIG. 1 will show that the front ends 70 of the staple pusher side walls 64 are formed in parallel relation to the front end wall 56 of the staple magazine 30 for close contact with the staple legs 38.

Seen at 72 in FIG. 1 is a pusher spring, shown as a helical tension spring, extending through a slot 74 defined longitudinally in the top guide wall 58 of the staple magazine 30. The pusher spring 72 is anchored at one end to a spring retainer 76 on the rear end of the staple pusher 32 and at the other end to another spring retainer 78 adjacent the front end of the staple magazine 30. Thus the pusher spring 72 urges the staple pusher 32 forwardly of the staple magazine 30 thereby enabling the staple pusher to push the staple bar 22 into abutment against the front end wall 56 of the staple magazine.

As will be noted from both FIGS. 1 and 8, the staple pusher 32 is molded integral with a thumbpiece 80 bridging the pair of side walls 64. The thumbpiece 80 affords a hold for the thumb in retracting the staple pusher 32 away from the front end wall 56 of the staple magazine 30 against the force of the pusher spring 72 for loading the staple bay 22 therein. The staple pusher 32 has a surface 71 for engaging the ornament 42 of the rearmost staple.

Handle

With reference to FIG. 1 the handle 34 is molded from a plastic approximately into the shape of an elongate, open bottom box. The rear end of the handle 34 is pivoted as aforesaid on the pair of trunnions 44 on the stapler base 26. Depending from the front end of the handle 34, the ejector 36 is to be thrusted into the staple magazine 30 via an opening 82, FIG. 7, in the front end of the top guide wall 58.

Figure 9:
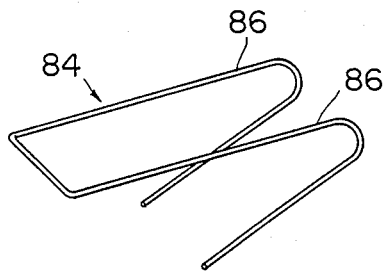
FIG. 9 is a perspective view of the handle spring of the stapler of FIG. 1.

A handle spring 84 is mounted between the staple magazine 30 and the handle 34 in order to normally provide an angular spacing therebetween. As better illustrated in FIG. 9, the handle spring 84 typically takes the form of a simple wire spring generally preformed into the shape of a U, with the two parallel limbs 86 of the spring further folded back for resilient engagement with a pair of L-shaped spring retainers 88, FIGS. 1 and 7, formed on both sides of the staple magazine 30. Thus the staple magazine 30 and the handle 34 are sprung away from each other. Normally, however, the staple magazine 30 and the handle 34 are maintained in the relative angular positions of FIG. 1, with the staple ejector 36 held close to the opening 82 in the staple magazine, as the spring retainers 88 yieldably engage protuberances, not shown, formed on the opposed inside surfaces of the handle.

Operation

For loading the staple bar 22 in the staple magazine 30, the user may hold the stapler 20 upside down and proceed to unfold the base 26 away from the staple magazine to a position spaced approximately 180 degrees from the handle 34. Then, with his thumb held against the thumbpiece 80, the user may retract the staple pusher 32 away from the front end wall 56 of the staple magazine 30 against the bias of the pusher spring 72. Then the staple bar 22 is placed between the staple pusher 32 and the front end wall 56 of the staple magazine 30, with the staple bridges 40 held against the top guide wall 58 of the staple magazine. When released subsequently, the staple pusher 32 will be sprung back forwardly of the staple magazine 30 thereby pressing the loaded staple bar 22 against the front end wall 56 of the staple magazine.

Now the user may fold the base 26 back to the FIG. 1 position. The stapler 20 is now ready for use.

Papers on the like to be stapled may be placed on the anvil 28 on the base 26, and the handle 34 is depressed, as is customary with hand staplers in general. The base spring 48 will first yield to such downward pressure, permitting the staple magazine 30 to pivot toward the base 26 together with the handle 34. Then, as the front end of the staple magazine 30 become pressed against the papers on the anvil 28, the handle spring 84 will yield to the continued exertion of downward force on the handle 34. The staple ejector 36 will then thrust into the staple magazine 30 through its front end opening 78 thereby driving the foremost staple 24 from within the staple magazine. After penetrating the papers this staple will have its legs clinched by being forced against the anvil 28.

Upon release of the manual force on the handle 34 the staple magazine 30 will pivot away from the base 26 together with the handle under the bias of the base spring 48. The handle itself will also pivot away from the staple magazine 30 under the influence of the handle spring 84, with the consequent withdrawal of the ejector 36 from within the staple magazine. Thereupon the remaining staple bar 22 will be thrusted into abutment against the front end wall 56 of the staple magazine 30 under the force of the pusher spring 72. Now the stapler 20 is ready for the next stapling operation.

Among the advantages gained by the stapler 20 is the fact that a plurality or multiplicity of ornamented sheet metal staples 24, preformed into the staple bar 22, can be loaded all together in the staple magazine 30 of matching configuration. The stapler can drive out the ornamented staples in a rapid succession just like the convnetional unornamented wire staples.

As will be understood from FIG. 1, the staple magazine 30 pivots on the base 26 about an axis positioned a considerable distance below the rear end of the magazine proper. The handle 34 also pivots about the same axis with respect to the base 26 and the staple magazine 30. Consequently, upon depression of the handle 34, both the front end of the staple magazine and the staple ejector 36 on the handle follow the paths that are substantially perpendicular to the base 26, thereby enabling each staple to infallibly bind papers or the like together.

Additionally, as best illustrated in FIG. 6, the base spring 48 is mounted in a state of precompression on the stapler base 26, exerting no force on the staple magazine 30 when the latter is in the FIG. 1 position. Therefore, since the base 26 and the magazine 30 can be relatively loosely interengaged to be retained in the relative angular positions of FIG. 1, only a minimal force is required for unfolding them in reloading the magazine.

It will also be noted that the pusher spring 72 extends rectilinearly between the staple pusher 32 and the front end of the staple magazine 30 for urging the former forwardly of the latter. Not only is the staple bar 22 positively sprung forwardly of the staple magazine 30, but also the staple pusher 32 and the pusher spring 72 can be readily mounted in position, no particular parts being required solely for supporting the pusher spring.

The staple pusher 32 offers still further advantages as the front ends 70 of its pair of side walls 64 are formed in parallel relation to the front end wall 56 of the staple magazine 30. The staple pusher 32 of this construction serves the dual purpose of positively pushing the staple bar 22 by close engagement with the pair of legs 38 of the rearmost staple 24, and of preventing the staple bar from falling down through the open bottom of the staple magazine 30.

Alternate Embodiment

Figure 10:
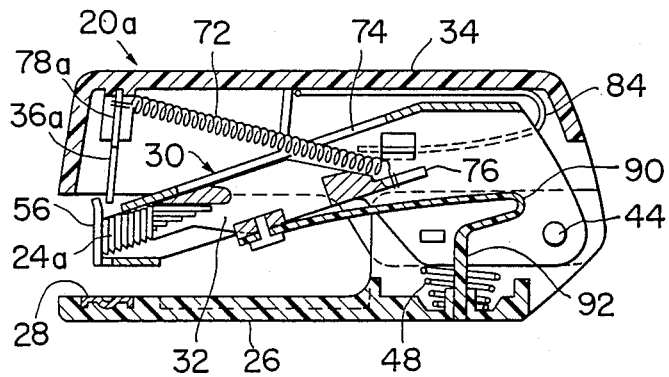
FIG. 10 is a longitudinal section through another preferred form of hand stapler in accordance with the invention.

The hand stapler 20a of FIG. 10 represents another preferred embodiment of the invention, featuring an elongate, flexible pull member 90 molded in one piece with a support column 92 erected on the stapler base 26. The free end of the pull member 92 is attached to the underside of the staple pusher 32.

It is understood that the pull member 90 is sufficiently long and flexible to permit the staple pusher 32 to travel forwardly of the staple magazine 30 as the staples are successively driven out. When the staples are used up, the stapler 20a may be unfolded in the same way as the FIG. 1 stapler 20. Then, such being the length of the pull member 90, the staple pusher 32 will be thereby pulled back to the rearmost position within the staple magazine 30 against the force of the pusher spring 72 when the stapler 20a is fully unfolded.

When the stapler 20a is folded back after reloading the staple magazine 30, the pull member 90 by virtue of its length and flexibility will permit the staple pusher 32 to be sprung forwardly of the staple magazine to press the loaded staple bar against the front end of the magazine. Now the stapler 20a is ready for use. It is thus seen that this stapler 20a requires no handling of the staple pusher 32 for reloading the staple magazine 30.

Figure 11:
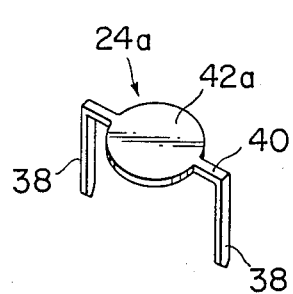
FIG. 11 is a perspective view of an alternative form of ornamented sheet metal staple suitable for use with the stapler of FIG. 10.

The stapler 20a incorporates some additional modifications for adaptation to use with ornamented sheet metal staples of the type generally designated 24a in FIG. 11. This staple 34a differs from the FIG. 4 staple 24 in that the ornament 42a extends toward both sides of the bridge 40, instead of toward one side only like the ornament 42 of the staple 24. Nevertheless, as will be readily understood, a plurality or multiplicity of such ornamented staples 24a can be joined into a staple bar similar to that shown in FIGS. 2 and 3, with the ornaments 42a in overlapping relation to one another.

Figure 12:
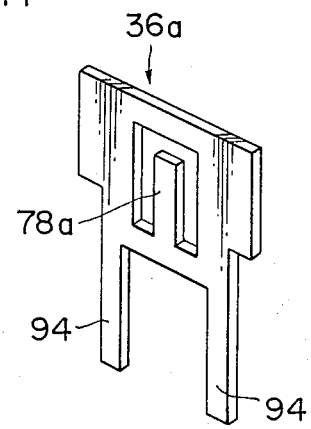
FIG. 12 is a perspective view of the staple ejector of the stapler of FIG. 10.

FIG. 12 is an illustration of the modified staple ejector 36a, incorporated in the FIG. 10 stapler 20a, for use with the alternative ornamented staples 24a. The staple ejector 36a is bifurcated to provide a pair of spaced apart prongs 94 for engaging only the top ends of the legs 38 of each staple 24a in driving it out of the staple magazine 30, thereby avoiding contact with the ornament 42a.

The staple ejector 36a further differs from the FIG. 1 ejector 36 in that it has a spring retainer 78a formed in one piece therewith. Thus, as will be understood by referring back to FIG. 10, the pusher spring 72 of the stapler 20a has its opposite extremities engaged with the spring retainer 76 on the rear end of the staple pusher 32 and with the spring retainer 78a integral with the staple ejector 36a by extending through the slot 74 in the staple magazine 30. The spring retainer 78a could be formed directly on the handle 34.

Figure 13:
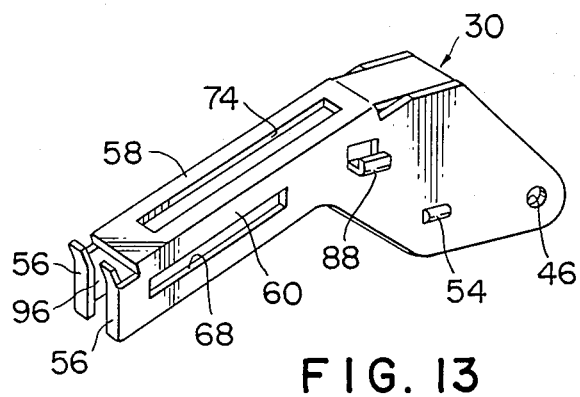
FIG. 13 is a perspective view of the staple magazine of the stapler of FIG. 10.

The staple magazine 30 of the stapler 20a also needs some slight modification for use with the FIG. 11 staples 24a. As clearly shown in FIG. 13, the staple magazine 30 has a relatively wide slot 96 formed in its front end wall 56. This slot 96 is intended for the passage of the forwardly extending portion of the ornament 42a of each staple 24a being driven out by the ejector 36a.

The stapler 20a is identical in the other details of construction and operation with the FIG. 1 stapler 20. Advantageouly, the stapler 20a lends itself to use with the ornamented staples of the types shown in both FIGS. 4 and 11, so that a wider variety of such staples may be put to use with the stapler 20a than with the stapler 20.

Possible Modifications

Despite the foregoing detailed disclosure it is not desired that the invention be limited by the exact details of the illustrated embodiments. A variety of modifications or alterations of the exemplified embodiments may be made without departing from the scope of the invention.

For example, the base spring 48 may take the form of a cantilever spring instead of the illustrated spiral compression spring. In this case, too, the pair of overhangs 50 or equivalent means may be provided on the stapler base for engaging the cantilever spring when the staple magazine is in the normal position of FIG. 1 or 10, in order that the magazine may be subjected to the force of the spring only when pivoted toward the base for stapling. This same contrivance may be employed in staplers for use with usual U-shaped staples.

Also, the disclosed embodiments are not intended to impose limitations on the choice of materials for the various components of the stapler. For example, the staple magazine may not necessarily be of metal but may be a rigid plastic molding. Additional modifications or alterations in the details of this disclosure may be made to conform to design preferences or to the requirements of each specific application of the invention.

What is claimed is:

1. In combination with a staple bar having a plurality of ornamented staples separably joined together, each ornamented staple having a bridge interconnecting a pair of parallel legs, and an ornament joined to the bridge, the staple bar being such that the ornaments of the staples are in overlapping relation to one another so that the bridges of the joined staples form an obtuse angle with respect to each pair of staple legs, a hand stapler comprising:
   (a) an elongate base having a front and a rear end, with an anvil disposed adjacent the front end of the base;
   (b) an elongate staple magazine to be loaded with the staple bar, the staple magazine having a rear end pivotally coupled to the rear end of the base and having a front end movable into and out of engagement with the anvil on the base, the staple magazine comprising a front end wall to be abutted upon by the loaded staple bar and an elongate guide wall for relative sliding contact with the bridges of the loaded staple bar, there being approximately the same obtuse angle between the front end wall and guide wall of the staple magazine as between the bridges of the staple bar and each pair of staple legs;
   (c) staple pusher means mounted to the staple magazine for pushing the loaded staple bar against the front wall of the staple magazine;

(d) a handle pivotally coupled to the base and the staple magazine and having a staple ejector for driving the successive staples out of the front end of the staple magazine against the anvil on the base.

2. The stapler of claim 1 wherein the staple magazine is pivotable with respect to the base at least between a first position, in which the front end of the staple magazine is held at a preassigned distance away from the anvil on the base, and a second position in which the front end of the staple magazine is held against the anvil, and wherein the stapler further comprises:
(a) a spring on the base for biasing the staple magazine from the second toward the first position; and
(b) retainer means on the base for engaging the spring and holding the same preloaded when the staple magazine is in the first position;
(c) whereby the staple magazine is free from the bias of the spring when in the first position.

3. The stapler of claim 1 wherein the staple pusher means comprises:
(a) a staple pusher slidably mounted within the staple magazine for abutting engagement with the staple bar loaded therein;
(b) there being a slot defined longitudinally in the guide wall of the staple magazine; and
(c) a spring extending through the slot in the guide wall and having one end anchored to the staple pusher and the other end to a spring retainer adjacent the front end of the staple magazine for energizing the staple pusher toward the front end of the staple magazine.

4. The stapler of claim 1 wherein the staple pusher means comprises:
(a) a staple pusher slidably mounted within the staple magazine for abutting engagement with the staple bar loaded therein;
(b) there being a slot defined longitudinally in the guide wall of the staple magazine; and
(c) a spring extending through the slot in the guide wall and having one end anchored to the staple pusher and the other end to a spring retainer on the handle for energizing the staple pusher toward the front end of the staple magazine.

5. The stapler of claim 4 wherein the spring retainer is integral with the staple ejector.

6. The stapler of claim 1 wherein the staple pusher means comprises:
(a) a staple pusher slidably mounted within the staple magazine and having a front end for abutting engagement with the staple bar loaded therein, the front end of the staple pusher being formed in parallel relation to the front end wall of the staple magazine; and
(b) spring means for urging the staple pusher toward the front end of the staple magazine.

7. The stapler of claim 1 wherein the staple pusher means comprises:
(a) a staple pusher slidably mounted within the staple magazine and having a pair of side walls rigidly interconnected in parallel spaced relation to each other, the pair of side walls having front ends formed in parallel relation to the front end wall of the staple magazine for neat engagement with the pair of legs of the rearmost staple of the staple bar loaded in the staple magazine; and
(b) spring means for urging the staple pusher toward the front end of the staple magazine.

8. The stapler of claim 1 wherein the staple pusher means comprises:
(a) a staple pusher slidably mounted within the staple magazine;
(b) spring means urging the staple pusher toward the front end of the staple magazine; and
(c) a flexible pull member having one end anchored to the base and another end to the staple pusher for causing the staple pusher to relatively travel away from the front end of the staple magazine against the force of the spring means when the handle and the staple magazine are jointly pivoted away from the base.

9. The stapler of claim 1 wherein the ornament of each staple has portions formed on both sides of the bridge, and wherein the front end wall of the staple magazine is slotted to permit the passage of the ornament of each staple being driven out of the staple magazine.

10. The stapler of claim 1 wherein the ornament of each staple has portions formed on both sides of the bridge, and wherein the staple ejector is bifurcated so as to avoid contact with the ornament of each staple.

* * * * *